United States Patent [19]

Landes

[11] 4,347,927
[45] Sep. 7, 1982

[54] SHEET ALIGNING APPARATUS

[75] Inventor: Raymond L. Landes, Perrysburg, Ohio

[73] Assignee: Libbey-Owens-Ford Company, Toledo, Ohio

[21] Appl. No.: 162,150

[22] Filed: Jun. 23, 1980

[51] Int. Cl.³ .............................................. B65G 47/26
[52] U.S. Cl. .................................. 198/434; 271/240; 269/305
[58] Field of Search ....................... 198/456, 434, 836; 65/148, 273, 106; 271/238, 240, 248, 250; 193/35 C, 38; 269/303–305, 315

[56] References Cited

U.S. PATENT DOCUMENTS 2,602,554  7/1952  Griffith .............................. 198/434
4,015,843  4/1977  Tennant ............................. 198/434
4,154,330  5/1979  Lucas ................................ 198/434

FOREIGN PATENT DOCUMENTS

2224720  3/1973  Fed. Rep. of Germany ...... 198/434
140343  12/1978  Fed. Rep. of Germany .

Primary Examiner—Robert B. Reeves
Assistant Examiner—Brian Bond
Attorney, Agent, or Firm—Collins, Oberlin & Darr

[57] ABSTRACT

An appartus for aligning an advancing plastic-glass sandwich on a conveyor to accurately direct the same in a desired orientation for proper entry into the restricted receiving zone of a pressing apparatus. The aligning apparatus includes a pair of pivotal arms located on one side of the sandwich and a third pivotal arm movable inwardly against the other side of the sandwich to urge the same against said first mentioned pair of arms while the sandwich is advanced therebetween.

9 Claims, 8 Drawing Figures

SHEET ALIGNING APPARATUS

BACKGROUND OF THE INVENTION

The present invention relates generally to the manufacture of laminated glass and, more particularly, to an apparatus for automatically aligning and accurately directing laminated glass units into a preliminary pressing apparatus employed in a glass laminating operation.

Generally, speaking, so-called laminated safety glass, such as are utilized as windshields for automobiles and the like, comprise two sheets of curved glass and a plastic interlayer interposed therebetween and bonded thereto to form the composite, laminated structure. In the mass production of these laminated glass units, it is customary to first assemble the various laminations in proper superimposed relation to form an assembly or "sandwich", press the sandwich to expel entrained air from between the various layers, and then bond the layers together by subjecting the assembly to the action of heat and pressure.

The preliminary pressing, or so-called "pre-pressing" operation is usually performed in two successive stages. During the first pre-pressing operation, the glass sheets are pressed tightly together to expel any entrained air from the spaces between the layers. Next, the sandwich is subjected to moderate heat sufficient to slightly soften the plastic interlayer and it is then pressed a second time to secure intimate contact between all portions of the plastic interlayer and the adjacent surfaces of the glass sheets. Following the second pressing operation, which also serves to seal the edges of the sandwich, the laminated assemblies are placed in an autoclave where they are subjected to sufficient heat and pressure to securely bond the plastic interlayer to the adjacent glass surfaces. The preliminary pressing operations are necessary to make sure that the glass and plastic interlayers are in sufficiently close contact so that the liquid in the autoclave will not penetrate between the layers of glass and thus interfere with the bonding of the plastic interlayers to the glass.

The apparatus for performing the preliminary pressing operations generally comprises an upper and lower series of pressing rollers arranged in axially parallel, tangentially contacting relation. The rollers are mounted in a cage or frame adapted to be swung arcuately from a sandwich receiving position to a sandwich discharge position. In a typical automated production line, the loosely assembled curved sandwich is advanced horizontally in a longitudinal direction or in a direction normal to the axis of the curvature thereof on a conveyor to the first pre-press section. The leading edge of the sandwich approaches and enters between the opposed pressing rollers along a plane that is generally tangential to each of the rollers which are now in the sandwich receiving position. As the rollers press and pass the sandwich therebetween, they are caused to swing arcuately about a common axis to revolve the sandwich through an arcuate path toward and onto a take-off conveyor.

The longitudinal axis of the sandwich relative to its path of movement on the entry conveyor must be oriented within prescribed limits in order to assure entry of the leading edge of the sandwich into the intended area or restricted target zone between the upper and lower series of pressing rollers. This has conventionally been accomplished by an attendant located at a station immediately forward or upstream of each pre-press section of each laminating production line to manually urge or shift the glass-plastic sandwiches relative to the conveyor into the desired orientation. It can be readily appreciated that such manual operations seriously impair efficiency in a mass production operation, and adds substantially to labor costs. Moreover, the attendant fatigue resulting from the complete concentration and constant surveillance on the part of the attendant in performing such arduous tasks contributes significantly to human error and poor judgment in properly aligning the sandwiches, resulting in glass damage and breakage and further adding to production costs.

SUMMARY OF THE INVENTION

Accordingly, it is a primary object of the present invention to obviate the above-noted shortcomings by providing a new and useful apparatus for automatically orienting a laminated assembly on a conveyor to accurately direct or guide the leading edge thereof into the desired area or restricted zone of an apparatus for performing a subsequently occurring laminating step.

It is another object of this invention to provide the foregoing apparatus with opposed pivotal arms movable into engagement against opposite edges of the assembly for precisely orienting the same in the desired position relative to the entry area of a pressing apparatus.

The foregoing and other objects, advantages, and characterizing features of the present invention will become clearly apparent from the ensuing detailed description of an illustrative embodiment thereof, taken together with the accompanying drawings wherein like reference numerals denote like parts throughout the various views.

DESCRIPTION OF THE PREFERRED EMBODIMENT

Figure 1:
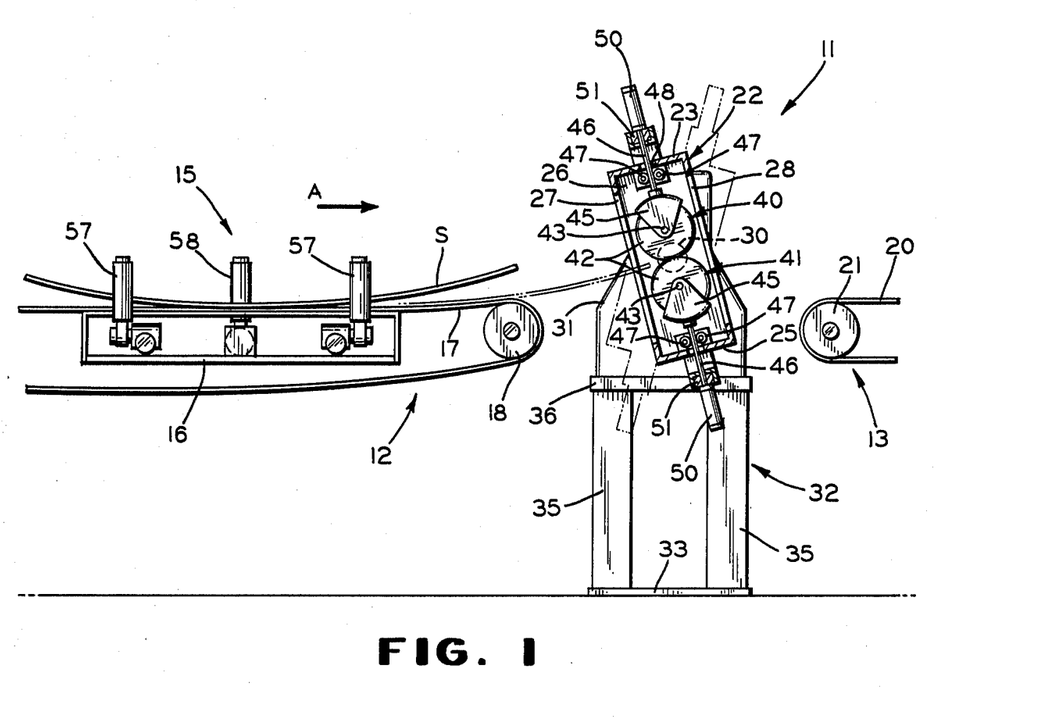
FIG. 1 is a diagrammatic side elevational view of the sandwich aligning apparatus of this invention, shown in conjunction with a pre-press apparatus.

Referring now in detail to the illustrative embodiment depicted in the accompanying drawings, there is shown diagrammatically in FIG. 1 a portion of a production line laminating apparatus, comprehensively designated 10, and which includes a preliminary pressing apparatus, generally designated 11, located between a delivery or entry conveyor 12 and a take-off or discharge conveyor 13. The preliminary pressing apparatus 11, hereinafter sometimes referred to as a "pre-press" apparatus, is adapted to receive a glass-plastic assembly or sandwich S from the conveyor 12 and, after subjecting the sandwich to a pressing operation, deliver the same to the conveyor 13 for subsequently occurring operations. A sandwich orienting or aligning apparatus, generally designated 15, constructed in accordance with this invention and which will hereinafter be more fully described in detail, is mounted on the frame of conveyor 12 for precisely locating the sandwich S on conveyor 12 so as to accurately guide or direct the leading edge of the sandwich S between the press rollers of the pre-press apparatus 11.

As is well known, laminated safety glass is generally composed of two sheets of glass, usually curved, and a sheet or layer of non-brittle thermoplastic material interposed therebetween to form the composite assembly or sandwich. This preparatory sandwich is ultimately formed into a transparent, unitary structure under the influence of heat and pressure and for this purpose the several layers are initially subjected to two pressing operations between which they may be heated. The first pressing operation serves importantly to expel entrained air and moisture from between the several layers and, after heating the plastic layer to a softened condition, the second pressing operation becomes effective to more intimately secure the respective surfaces into positive contact, especially about the marginal edges of the sandwich to preclude the entry of objectionable, heated oil between the layers during the final pressing or autoclave operation. The illustrative embodiment of the pre-press apparatus 11 shown in FIG. 1 can be employed in either or both of the sequentially occurring pre-pressing operations normally carried out in a glass-plastic laminating production line.

The entry conveyor 12 includes the usual frame 16 for supporting the active run of an endless conveyor belt 17 suitably entrained about a drive roller (not shown) and an idler roller 18 for movement in an endless orbital path. The active run of the conveyor belt 17 may be substantially horizontal, curved upwardly adjacent the trailing edge thereof as shown in FIG. 1, or formed with upwardly and downwardly sloping portions, as desired or required to guide the leading edge of the sandwich S into the target zone formed between the upper and lower press rollers of apparatus 11. The take-off conveyor 13 is similar in construction to conveyor 12 and includes an endless conveyor belt 20 entrained about two or more rollers 21, any one of which may be the drive roller. Suitable power means (not shown) are employed to drive the conveyor belts 17 and 20 at the appropriate speeds in a manner well known in the art. Since the conveyors 12 and 13 can be of any conventional form and, per se, form no part of the present invention, it is believed that no further amplification or description thereof is necessary.

Likewise, it is believed that only a diagrammatic illustration and cursory description of the preliminary pressing apparatus 11 will suffice, since it too can be of conventional type and, per se, forms no part of this invention. To this end, the preliminary pressing or pre-press apparatus 11 includes a pivotal press roller supporting frame or cage 22 having an upper wall 23, a lower wall 25, a pair of end walls 26 and generally open front and rear ends 27 and 28. The end walls 26 (only one of which is shown in FIG. 1) are provided with pivot stub shafts 30 journalled for pivotal or swinging movement in suitable upright side members 31 (only one shown in FIG. 1). These side members form a part of the structural frame, generally designated 32, which also includes a base member 33, vertically extending columns 35 and horizontal plate members 36 for supporting the upright side members 31.

Suitably mounted within the cage 22 are upper and lower roll assemblies, generally indicated by the numerals 40 and 41. Each of the roll assemblies 40,41 are composed of a series of rollers 42 that are supported in individual pairs and in such a manner that opposed pairs of rollers 42 of the roll assemblies 40 and 41 will be constantly urged into surface contact. Each pair of rollers 42 of the upper roll assembly 40 is mounted in laterally spaced relation on a common axle 43 journalled at its opposite ends in a saddle member 45. The saddle member 45 is attached to the distal end of a piston rod 46 guided between rollers 47 and extending through a suitable opening 48 in the top wall 23 of cage 22. The piston rod 46 is secured to the usual piston (not shown) mounted for reciprocal movement within a cylinder 50 mounted on a block 51 forming a part of the structural framework of cage 22. Each pair of rollers 42 of the lower roll assembly 41 is similarly mounted and the same reference numerals denote like parts. The cylinders 50 apply a bias force to their respective rollers 42 to maintain substantially constant contact between the opposed pair of rollers 42 and exert the desired amount of pressure against the sandwich S passing therebetween. Each opposed pair of rollers 42 are aligned and adapted to move in unison in directions generally normal to the surfaces of the sandwich i. e. directions parallel to the piston rods 46, to follow and conform to the bent curvature of the sandwich, which generally is bent about its longitudinal axis as well as its transverse axis. Thus, each pair of opposed rollers 42 may be displaced out of alignment with the adjacent opposed pair of rollers 42 as dictated by the transverse configuration of the sandwich S. Suitable means (not shown) are provided for swinging the cage 22 about a horizontal axis extending through and defined by pivot stub shafts 30, as well as driving the series of paired rollers 42 of the roll assembly 41 to provide the necessary traction to advance the sandwich S between the roll assemblies 40 and 41.

It will be appreciated that the height and angular attitude of the press rollers 42 in their sandwich receiving position, as well as the path of movement of the active run of conveyor belt 17, is adjusted in a manner to assure entry of the leading edge of the curved sandwich S into the restricted receiving area or target zone of the pressing apparatus i. e. along a plane which is substantially tangential to both of the cylindrical surfaces of the opposed pairs of rollers 42. Such pre-operative adjustments presupposes that the orientation of the sandwich S relative to the conveyor belt 17 in a production flow of such sandwiches will remain substantially the same within prescribed limits so that each will enter the desired zone and be pre-pressed in a substantially identically automatic manner. However, in practice, the disposition of such advancing sandwiches on the conveyor belt can vary from sandwich to sandwich due to haphazard placement thereof on the entry conveyor from a previously production operation or to shifting of the sandwich on the conveyor, especially during a change in direction of the path of movement. Any deviation outside of the above-mentioned restricted entry zone can result in damage or breakage of the glass. Accordingly, an attendant is positioned along a production line immediately upstream of each pre-press station to manually direct or reorient each sandwich to assure entry of its leading edge into the entry zone between the opposed press rollers 42. The labor involved in such arduous tasks in a multi-production line laminating facility drastically increases production cost. Moreover, human error and poor judgment compounded by the fatigue resulting from constant surveillance by the attendant in performing this monotonous chore often results in improper orientation of the sandwich causing breakage and adding further to production costs.

The present invention addresses this problem and avoids the above noted disadvantages by providing the hereinbefore mentioned aligning apparatus 15 immediately upstream of the pre-press apparatus for automatically aligning each sandwich rapidly and smoothly relative to the conveyor to assure advancement of the sanwich in its proper course and thereby precise entry into the receiving zone between the opposed press rollers.

To this end, apparatus 15 includes a base plate 55 suitably supported on the upper ends of structural members 56 forming a part of the conveyor framework. Suitably mounted on the base plate 55 by mounting means hereinafter described in detail are a pair of pivotal aligning arm assemblies 57 along one side of the conveyor belt 17 and a third pivotal aligning arm assembly 58 along the other or opposite side of the conveyor belt 17. Since the aligning arms 57 and the mounting means therefor are identical, only one will be described in detail below with the same reference characters being applied to similar parts of both arm assemblies 57.

Figure 3:
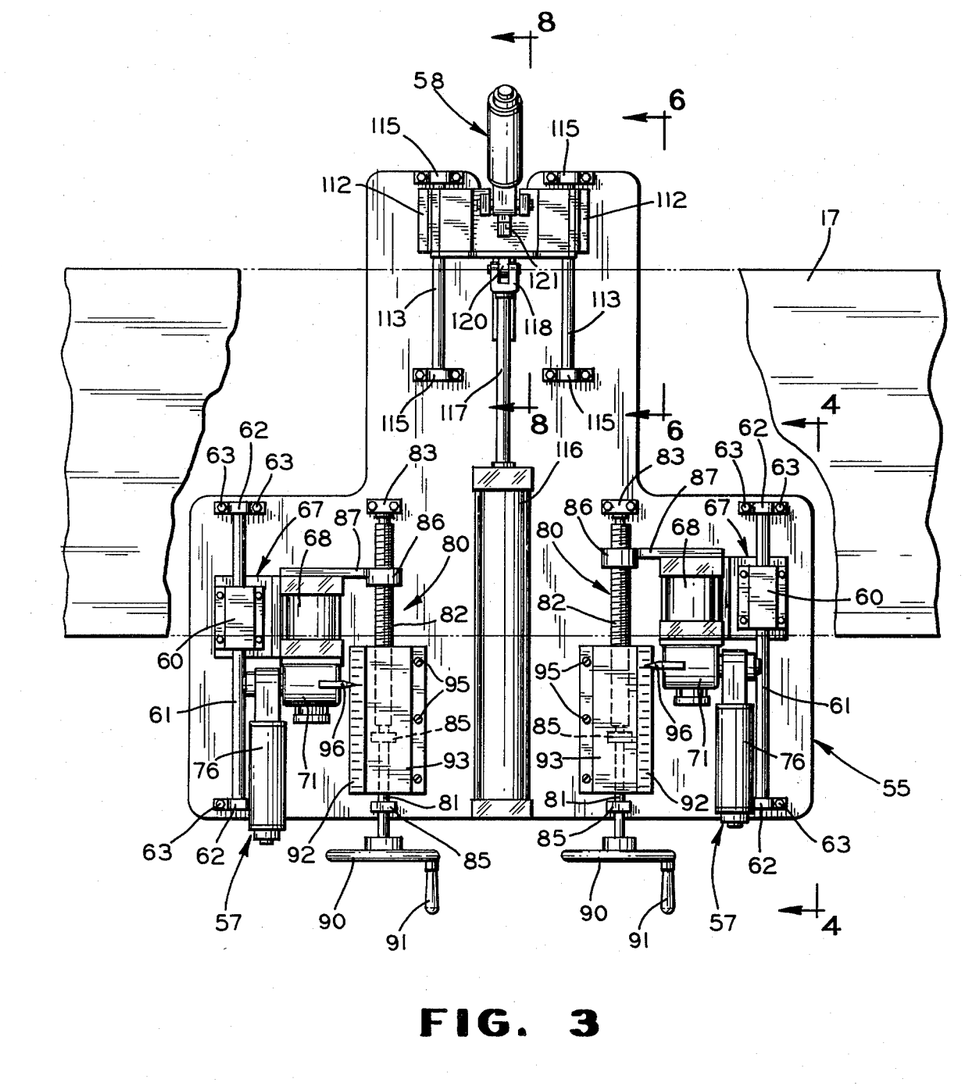
FIG. 3 is a top plan detailed view of the sandwich aligning apparatus constructed in accordance with this invention.
Figure 4:
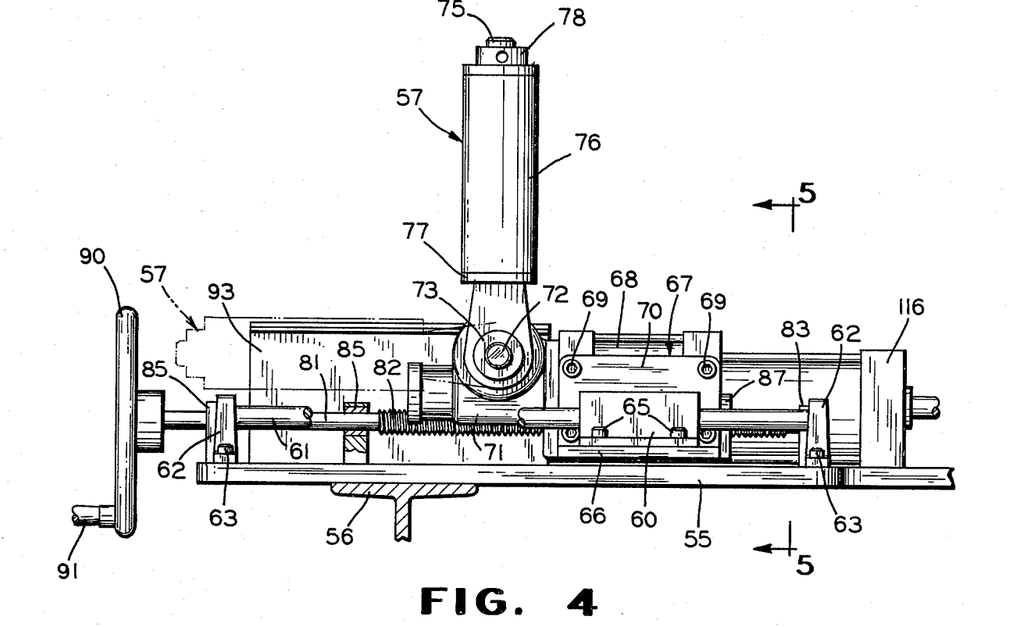
FIG. 4 is a vertical sectional view, on an enlarged scale, taken along line 4—4 of FIG. 3.
Figure 5:
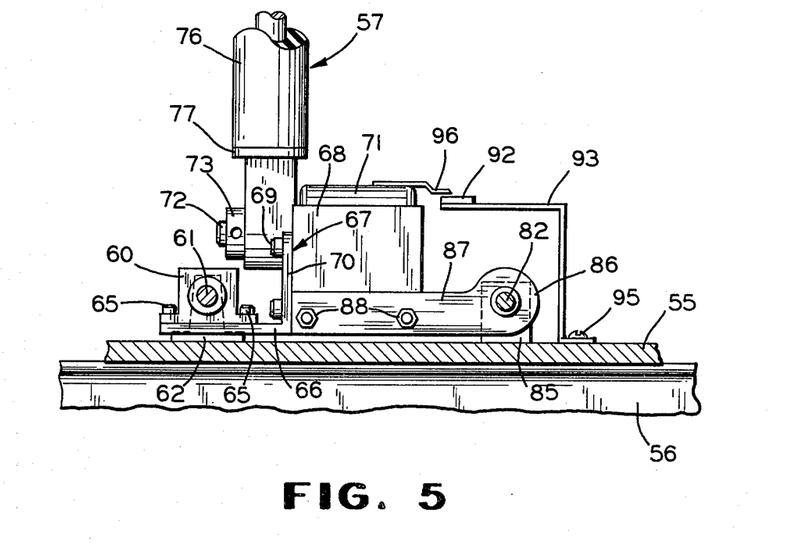
FIG. 5 is a vertical sectional view taken along line 5—5 of FIG. 4.

Referring now particularly to FIGS. 3 to 5, the means for mounting each aligning arm assembly 57 includes a slide block 60 mounted for rectilinear sliding movement on a rail 61 in the form of a cylindrical rod supported at its opposite ends in upstanding brackets 62 rigidly secured to the plate 55 as by fasteners 63. The slide block 60 is affixed, as by screws 65, to the horizontal leg 66 of an angle bracket, generally designated 67. An hydraulic rotary cylinder or motor 68 is secured, as by fasteners 69, to the vertical leg 70 of bracket 67 and provides the power source for pivoting the arms 57 between an upright glass engaging position shown in full lines in FIG. 4 and a lower, substantially horizontal rest position shown in phantom in FIG. 4. The motor 68 is effective for rotating, through a suitable gear reduction mechanism 71 associated therewith, an output shaft 72. The arm 57 is mounted on shaft 72 and held in place thereon by means of a removable lock collar 73. The arm 57 is formed with a shaft 75 having a sleeve or roller 76 disposed thereon and between a shoulder 77 formed on the arm and a lock collar 78 securing the roller in place. The roller 76 is mounted on shaft 75 for free rotary movement thereabout and is adapted to engage the marginal edge of an advancing sandwich S. The roller 76 can be formed of a suitable resiliently yieldable material such as rubber, neoprene, and the like to afford a cushion for the marginal edge of the sandwich and to prevent marring thereof.

In order to accommodate sandwiches of different sizes, each of the aligning arms 57 is adjustable in a direction normal to the path of sandwich movement or toward and away from the opposed arm 58. To this end, means are provided for moving the slide block 60, together with the attached motor 68 and arm 57 in such direction. Such means comprises a jack screw arrangement 80 including an elongated, horizontally extending rod 81 having a threaded portion 82 and supported in spaced relation to base plate 55. The rod 81 is journalled for rotation in a bearing block 83 at the distal end thereof and in spaced bearing blocks 85 on the other side of the threaded portion 82. The portion 82 is threaded into a nut 86 affixed to the end of an arm 87 rigidly secured to the motor housing by suitable fasteners 88. Since the rod 81 is fixed against axial movement, rotation thereof and the threaded portion 82 effects axial movement of the nut 86 and thereby the slide block 60 along rail 61 in a path parallel to the rod. A wheel 90 is affixed to the end of rod 81 and is provided with a hand grip 91 for facilitating manual rotation of the rod 81.

A calibrated scale 92 is supported along one edge of an inverted L-shaped bracket 93 secured at its lower end to the base plate 55 by suitable fasteners 95. A pointer 96 is affixed to the upper end of the gear reducer housing and extends over the scale 92. Thus, predetermined lateral adjustments of the arms 57 toward and away from the conveyor belt 17 can be readily made and visually observed as dictated by the lateral extend or widths of the specific sandwiches intended to be processed.

Figure 6:
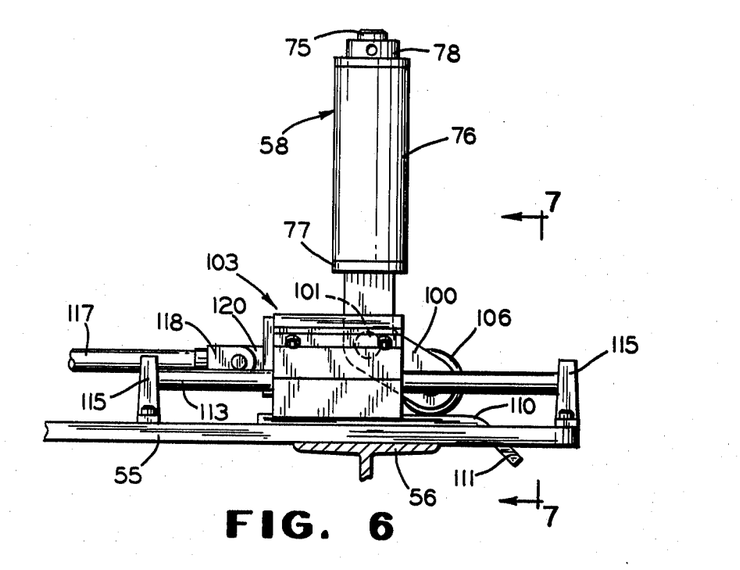
FIG. 6 is a vertical sectional view, on an enlarged scale, taken along the line 6—6 of FIG. 3.
Figure 7:
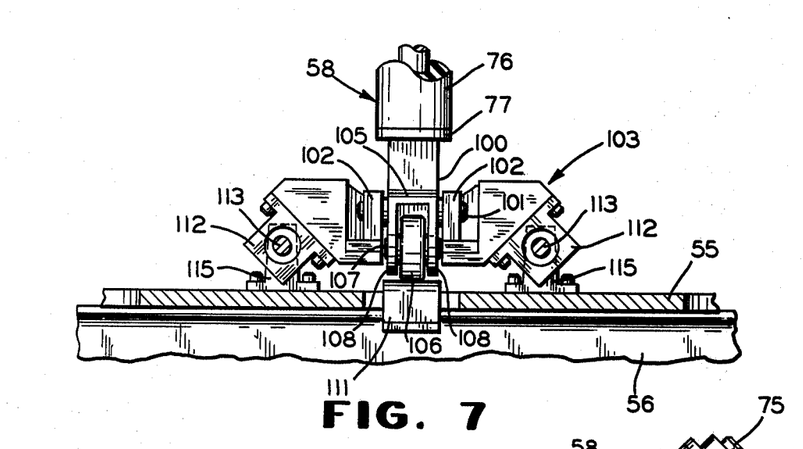
FIG. 7 is a vertical sectional view taken along line 7—7 of FIG. 6.
Figure 8:
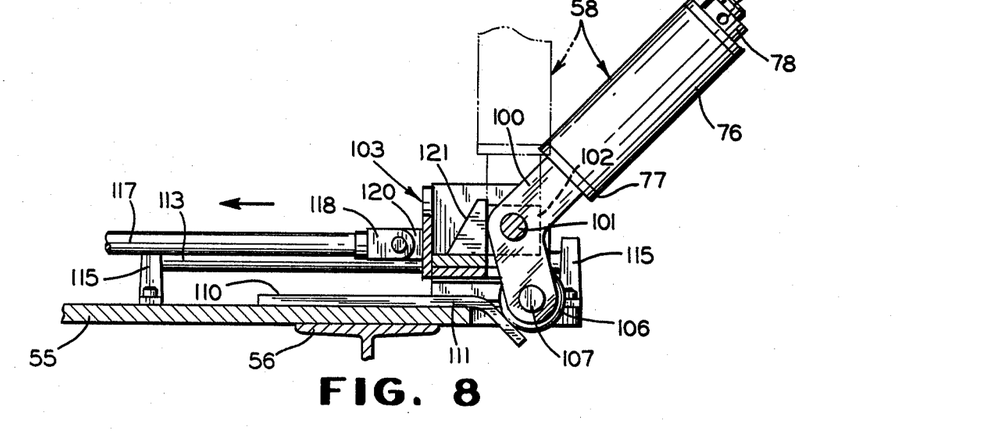
FIG. 8 is a vertical sectional view, on an enlarged scale, taken along the line 8—8 of FIG. 3.

As shown in FIGS. 6-8, the mounting and actuating means for the opposed aligning arm assembly 58 is somewhat different from the arms 57. However, except for the lower connecting end of the arm assembly 58, its construction is substantially similar to arm assemblies 57 and the same reference characters denote like parts. The lower end of the arm assembly 58 is in the form of a bell crank 100 pivotally mounted on a pivot pin 101 journalled at its opposite ends in bearing blocks 102 rigidly secured to a carriage, generally designated 103. Also, the extreme lower end of the arm is provided with a yoke member 105 for supporting a roller 106 mounted on a shaft 107 supported at its opposite ends in the bifurcations 108 of the yoke member. The roller 106 serves as a cam follower riding on the surface 110 of a cam member 111 secured to base plate 55 for a purpose hereinafter explained.

The carriage 103 includes a pair of spaced slide blocks 112 mounted for reciprocal movement on rails 113 in the form of cylindrical rods in substantially spaced, parallel relation with the base plate 55 and suitably supported at their opposite ends, respectively, in upstanding brackets 115, in turn fastened to the base plate 55.

The means for actuating aligning arm assembly 58 includes a fluid cylinder 116 mounted on base plate 55 and having the usual reciprocal piston (not shown) connected to a piston rod 117. The distal end of piston rod 117 is provided with a connector 118 pivotally connected to a lug 120 connected to and projecting upwardly from the carriage 103. Thus, extension and retraction of the piston rod 117 affects reciprocal movement of the carriage 103 in a direction transverse to the path of movement of the sandwich S.

The aligning arm assembly 58 normally is disposed at its extreme outward position at an angular attitude, such as shown in full lines in FIG. 8, with the cam follower roller 106 disposed on the rearward inclined portion of the cam surface 110. Upon retraction of the piston rod 117, the carriage 103 is moved inwardly and the roller 106 rides up the inclined portion of the cam surface 110 and onto the horizontal portion thereof, pivoting the bell crank 100 along with the arm assembly 58 counterclockwise about the pivot pin 101 until the arm assembly 58 reaches the substantially upright position shown in phantom in FIG. 8. A stop member 121 mounted on the carriage limits further pivotal movement of the arm assembly 58 to maintain the latter in such upright position during continued movement of the carriage 103 and thereby arm assembly 58 inwardly toward the conveyor belt 17.

Figure 2:
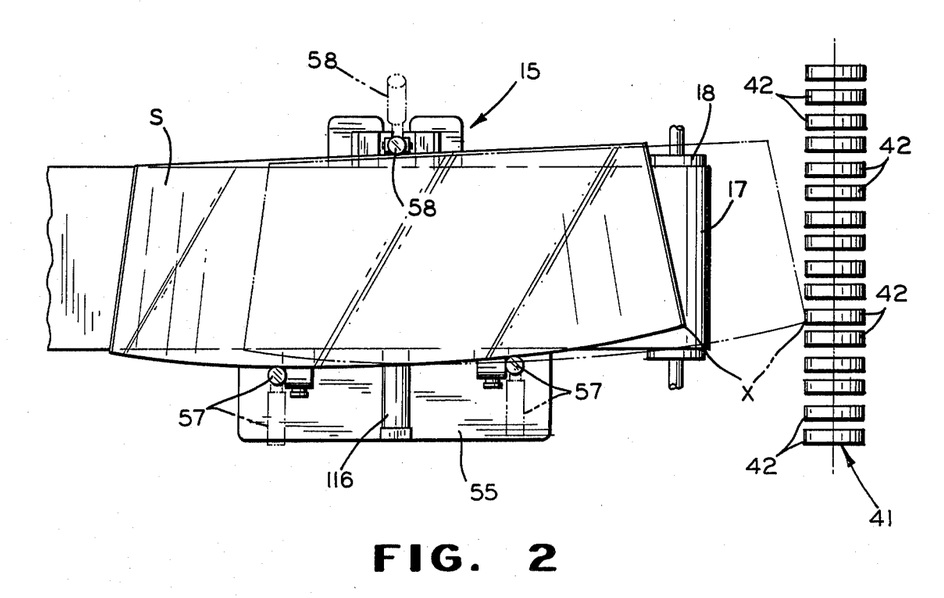
FIG. 2 is a diagrammatic top plan view of the apparatus shown in FIG. 1.

In operation, sandwiches S are supported and advanced one at a time in a generally horizontal path on the entry conveyor 12 in the direction of arrow A shown in FIG. 1. The sandwiches S are positioned on the conveyor belt 17 in a manner disposing their longitudinal axes in a direction generally parallel to the path of movement. With the arm assemblies 57 and 58 in their lowered positions and the cage 22 tilted forward as shown in FIG. 1, the mode of operation of the apparatus in processing a single sandwich S is as follows:

As the sandwich S reaches a predetermined position along conveyor belt 17 upstream of the aligning apparatus 15, a suitable detection device (not shown) energizes a control system (also not shown) to activate hydraulic motors 68 to pivot the arm assemblies 57 upwardly from their lower, rest positions into their upright, glass engaging positions. At the same time, the cylinder 116 is actuated to retract piston rod 117 and the attached carriage 103 causing the arm assembly 58, via cam 111 and follower 106, to swing upwardly from its angular attitude into an upright position shown in phantom in FIG. 8. The arm assembly 58, during such pivotal movement and while reaching its uppermost position, continues to move inwardly by virtue of the retracting piston rod 117. The moving arm assembly 58 engages one side of the sandwich S and shifts or urges the sandwich against the opposite upright arms 57 to guide the sandwich on the conveyor belt 17 in the desired orientation. As shown in FIG. 2, the outline configuration of the sandwich is non-rectangular so that the sandwich enters the pre-press apparatus 11 at a corner X thereof. It will be seen that the two longitudinal edges of the sandwich are engaged at three points to accurately align or orient the sandwich S on conveyor belt 17 to assure proper entry of the leading corner X of the sandwich S into the restricted zone between the opposed press rollers 42. Immediately after reorienting the sandwich S, the arm assembly 58 is moved outwardly into its normal out-of-the-way position and the arm assemblies 57 are lowered into their rest positions in readiness for the next aligning cycle. As is well known, the sandwich passes between the opposed rollers 42 of the pre-press apparatus 11 and the cage 22, along with the encased press roll assemblies 40 and 41, rock from the forward position shown in full lines in FIG. 1 to the rearward or discharge position shown in phantom therein to deposit the pressed sandwich S onto the take-off conveyor 13. The pre-press apparatus 11 may be the first pre-press station where entrained air is expelled from between the layers of the sandwich S or it may be the second pre-press station downstream of the heating phase and whereat the opposed multi-layered surfaces of the sandwich are brought into intimate contact and the marginal edges thereabout are properly sealed.

Actuation of the motors 68, as well as cylinder 116, is effected by conventional fluid control valves properly sequenced for operation preferably by an electrical timer arrangement, or by conventional limit switches if desired, either of which can form a part of the electric control circuitry. Since such control arrangements are known and, per se, form no part of the present invention, it is believed that no further amplification or description thereof is believed necessary.

From the foregoing, it is apparent that the objects of the invention has been fully accomplished. As a result of this invention, a novel apparatus is provided for automatically aligning a laminated assembly on a conveyor belt rapidly, accurately and smoothly in a continuous laminating line operation for assuring entry of the laminated assembly's leading edge into the desired zone between opposed press rollers. In accord with this invention, this is accomplished by pivotable aligning arms brought into engagement with the laminated assembly against the opposite sides thereof while being advanced toward said opposed press rollers. By this arrangement, otherwise expensive manual labor and the attendant glass breakage resulting from human error, is virtually eliminated.

It is to be understood that the form of the invention herewith shown and described is to be taken as an illustrative embodiment only of the same and that various changes in the shape, size and arrangement of parts may be resorted to without departing from the spirit of the invention.

I claim:

1. A sheet aligning apparatus comprising: a frame, a conveyor mounted on said frame for supporting and advancing a horizontally disposed stacked sheet assembly in a generally horizontal path toward an apparatus having a restricted zone for receiving said sheet assembly, and means along said path immediately upstream of said apparatus for aligning said stacked sheet assembly on said conveyor to guide the leading end of said assembly into said restricted zone, said aligning means comprising a plurality of arms on said frame disposed in an opposed relation on opposite sides of said conveyor, and means moving said arms laterally inwardly into engagement with the opposite sides of said advancing sheet assembly for urging the same in a desired orientation to assure entry of said leading end into said restricted zone, said moving means including means for sequentially swinging one of said arms from an angular position of rest into an upright position and then moving said one arm bodily laterally inwardly into a sheet assembly engageable position.

2. An apparatus according to claim 1, wherein two of said arms are located on one side of said conveyor in longitudinally spaced relation therealong and said one arm being located on the opposite side of said conveyor on a transverse line intermediate said two longitudinally spaced arms.

3. An apparatus according to claim 2, wherein said moving means further includes additional means for pivoting said two arms between a lower out-of-the-way position and an upright sheet assembly engageable position.

4. An apparatus according to claim 1, wherein each of said arms comprises a shaft having a roller mounted thereon for free rotation thereabout.

5. An apparatus according to claim 4, wherein said roller is formed of a resiliently yieldable material.

6. A sheet aligning apparatus comprising: a frame, a conveyor mounted on said frame for supporting and advancing a horizontally disposed stacked sheet assembly in a generally horizontal path toward an apparatus having a restricted zone for receiving said sheet assembly, and means along said path immediately upstream of said apparatus for aligning said stacked sheet assembly on said conveyor to guide the leading end of said assembly into said restricted zone, said aligning means comprising a plurality of arms on said frame disposed in an opposed relation on opposite sides of said conveyor, means moving said arms laterally inwardly into engagement with the opposite sides of said advancing sheet assembly for urging the same in a desired orientation to assure entry of said leading end into said restricted zone, two of said arms being located on one side of said conveyor in longitudinally spaced relation therealong and a third one of said arms being located on the opposite side of said conveyor on a transverse line intermediate said two longitudinally spaced arms, means for mounting said two arms on said frame, said mounting means comprising a pair of blocks supported on said frame for horizontal sliding movement relative thereto toward and away from said conveyor, and said two arms pivotally mounted on said blocks, respectively.

7. An apparatus according to claim 6, including means for selectively moving said blocks and thereby said two arms toward and away from said conveyor for accommodating sheet assemblies of different widths.

8. A sheet aligning apparatus comprising: a frame, a conveyor mounted on said frame for supporting and advancing a horizontally disposed stacked sheet assembly in a generally horizontal path toward an apparatus having a restricted zone for receiving said sheet assembly, and means along said path immediately upstream of said apparatus for aligning said stacked sheet assembly on said conveyor to guide the leading end of said assembly into said restricted zone, said aligning means comprising a plurality of arms on said frame disposed in an opposed relation on opposite sides of said conveyor, and means moving said arms laterally inwardly into engagement with the opposite sides of said advancing sheet assembly for urging the same in a desired orientation to assure entry of said leading end into said restricted zone, two of said arms being located on one side of said conveyor in longitudinally spaced relation therealong and a third one of said arms being located on the opposite side of said conveyor on a transverse line intermediate said two longitudinally spaced arms, said moving means including second means for sequentially swinging said third arm from an angular position of rest into an upright position and then laterally inwardly into a sheet assembly engageable position, and means for mounting said third arm on said frame, said mounting means comprising a slide block connected to said second moving means for movement relative to said frame horizontally toward and away from said conveyor, said third arm pivotally mounted adjacent the lower end thereof to said slide block.

9. An apparatus according to claim 8, including cam means associated with the lower distal end of said third arm causing said arm to swing upwardly from said angular position to said upright position upon movement of said slide block toward said conveyor.

* * * * *

UNITED STATES PATENT AND TRADEMARK OFFICE
CERTIFICATE OF CORRECTION

PATENT NO. : 4,347,927
DATED : Sept. 7, 1982
INVENTOR(S) : Raymond L. Landes

It is certified that error appears in the above-identified patent and that said Letters Patent are hereby corrected as shown below:

Col. 4, line 61, "previously" should be --previous--
Col. 5, line 16, "sanwich" should be --sandwich--
      line 35, "ridigly" should be --rigidly--
Col. 6, line 53, "upwardly" should be --inwardly--

Signed and Sealed this

Fifteenth Day of February 1983

[SEAL]

Attest:

GERALD J. MOSSINGHOFF

Attesting Officer     Commissioner of Patents and Trademarks